United States Patent
Watts (10) Patent No.: US 6,336,161 B1
(45) Date of Patent: *Jan. 1, 2002

(54) COMPUTER CONFIGURATION SYSTEM AND METHOD WITH STATE AND RESTORATION FROM NON-VOLATILE SEMICONDUCTOR MEMORY

(75) Inventor: LaVaughn Watts, Temple, TX (US)

(73) Assignee: Texas Instruments Incorporated, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/572,972

(22) Filed: Dec. 15, 1995

(51) Int. Cl.$^7$ ............................. G06F 12/16; G11C 13/00
(52) U.S. Cl. ........................ 711/103; 711/162; 711/170; 713/1; 713/2; 714/15
(58) Field of Search ................ 395/489, 490, 395/497.01, 430, 182.13, 182.18, 182.2, 182.22, 651, 652, 653, 569; 711/162, 163, 170, 103; 714/15, 20, 22, 24; 713/1, 2, 100; 712/228

(56) References Cited

U.S. PATENT DOCUMENTS

| | | | | |
|---|---|---|---|---|
| 4,327,410 A | * | 4/1982 | Patel et al. ................ | 395/489 |
| 4,907,150 A | * | 3/1990 | Arroyo et al. ............. | 395/182.22 |
| 5,021,983 A | * | 6/1991 | Nguyen et al. ............ | 395/182.22 |
| 5,497,490 A | * | 3/1996 | Harada et al. ............. | 395/653 |
| 5,581,785 A | * | 12/1996 | Nakamura et al. ......... | 395/497.01 |
| 5,590,315 A | * | 12/1996 | Hess et al. ................. | 395/182.22 |

* cited by examiner

*Primary Examiner*—Glenn Gossage
(74) *Attorney, Agent, or Firm*—Ronald O. Neerings; Wade James Brady, III; Frederick J. Telecky, Jr.

(57) ABSTRACT

A computer system and method provides a user the ability to restore operation to a previous state from a non-volatile semiconductor memory. The computer system includes flash EEPROM (electrically erasable programmable read only memory) or another non-volatile semiconductor memory for storing hardware configuration and other state information prior to a system power-down. The configuration information is used at power up to reconfigure devices coupled to the processor, such as a hard disk drive controller, video controller, sound card, and so on. Remaining memory in the computer system can be restored either from a hard disk drive (or other mass storage device), or from flash memory. The flash memory may be combined with fast semiconductor memory, such as dynamic random access memory (DRAM) in a module, such that the necessary amount of non-volatile memory may be added whenever fast semiconductor memory is added.

32 Claims, 5 Drawing Sheets

COMPUTER CONFIGURATION SYSTEM AND METHOD WITH STATE AND RESTORATION FROM NON-VOLATILE SEMICONDUCTOR MEMORY

BACKGROUND OF THE INVENTION

1. Technical Field

This invention relates in general to computers and, more particularly, to storage of state information at power-down.

2. Description of the Related Art

As personal computers become more prevalent in today's society, the amount of energy used by computers has become a significant concern. Additionally, portable computers typically use a battery as their power source, and batteries typically can power a computer from two to six hours. It is desirable to extend battery life as long as possible.

The most effective technique for conserving energy, from an energy standpoint, is to turn off the computer while it is not being used. This technique is impractical for a number of reasons. First, some functions of the computer are lost when the computer is off, such as receiving fax and data communications over the telephone system. Second, restarting the computer is a time consuming procedure. Third, even after the computer is restarted, it does not return to the state as it was when the user decided to power-down. Therefore, the user must re-execute all application programs and open files as they were at power-down to restore the state of the computer, if the prior state is desired.

When the computer is initially powered, it looks for a boot (or "boot strap") program, typically stored in the system BIOS (basic input/output system) for an MS-DOS (Microsoft disk operating system) operating system (from Microsoft Corporation of Redmond, Wash.), or similar program. The boot program provides the code to begin loading the operating system. In an IBM-compatible (International Business Machines Company of Armonk, N.Y.) operating system using MS-DOS, two files, are initially loaded—autoexec.bat and config.sys, which control the set-up of the computer on power-up. Other operating systems use similar files to define the correct initiation procedure. Among other information, autoexec.bat and config.sys provide information which indicates the proper drivers for the hardware being used in the system. Also, these files may specify other programs which the user desires to have open at start-up.

When a computer is turned off, all of this information is lost, and the entire start-up procedure must be repeated, which can take several minutes, depending upon the size of the drivers and start-up programs. Additionally, in order to prevent loss of data from active programs, each program must be closed before turning off the computer's power. Thus, users may seldom turn off their computers, even during fairly long periods of inactivity, because of the time involved in shut down and start up.

In order to conserve energy, many computers use reduced power modes where some or all of their resources are operated at low speed, or shut off completely, to reduce power in certain situations. For example, after detecting a period of inactivity, the computer may reduce the processor's frequency and slow the refresh of the DRAM (dynamic random access memory) cells. This cycle is referred to as "suspend" mode. When activity resumes, the normal operating characteristics are restored.

Another technique which has been used in the past is "sleep" or "hibernate" mode, where the state of the computer is stored to the hard drive upon entering the hibernate mode. The copied data includes data from the CPU (central processing unit) registers, the CMOS (complementary metal oxide semiconductor) registers, the video memory and the DRAM. Upon rebooting the computer, the state of the computer is restored to its pre-hibernation state by transferring the state data from the hard drive back to the respective locations in the computer.

This technique has several limitations. First, a large amount of hard drive memory must be allocated, mostly for the DRAM and video memories. In order to avoid problems with modification of the system memory, such as increasing the video memory or the main (DRAM) memory, the amount of hard drive storage must include space for expansion. To completely avoid the possibility of having reserved too little space on the hard drive, a space equal to the entire address space of the CPU and the entire address space of the video card must be reserved. With present day microprocessors having an address space equal to four gigabytes, such a solution is impractical.

Another problem is that after power down, the device drivers are no longer in memory. Consequently, the transfer of data from the hard drive to the various memories is performed using default drivers, which could result in errors in some case.

Therefore, a need has arisen for a method of safely and efficiently restoring the state of a computer after power down at high speed.

SUMMARY OF THE INVENTION

The computer system of the present invention comprises a non-volatile semiconductor memory coupled to a processor and a plurality of devices having internal memories for storing configuration information. System Configuration information is transferred to a flash EEPROM (electrically erasable programmable read only memory) prior to power-down.

The present invention provides significant advantages over the prior art. First, all devices, such as a sound card, hard drive, I/O (input/output), and so on, are not used until they have been properly initialized. Second, prior operation state of the computer system can be quickly restored upon power-up. Third, the user can return to the exact state prior to power down, without reloading application programs and files. Fourth, since returning to a prior state is simplified, the computer system may be powered down more often, resulting in vastly improved power use. Fifth, the amount of non-volatile semiconductor memory can be added as needed.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

The present invention is best understood in relation to FIGS. 1–12 of the drawings, like numerals being used for like elements of the various drawings.

Figure 1:
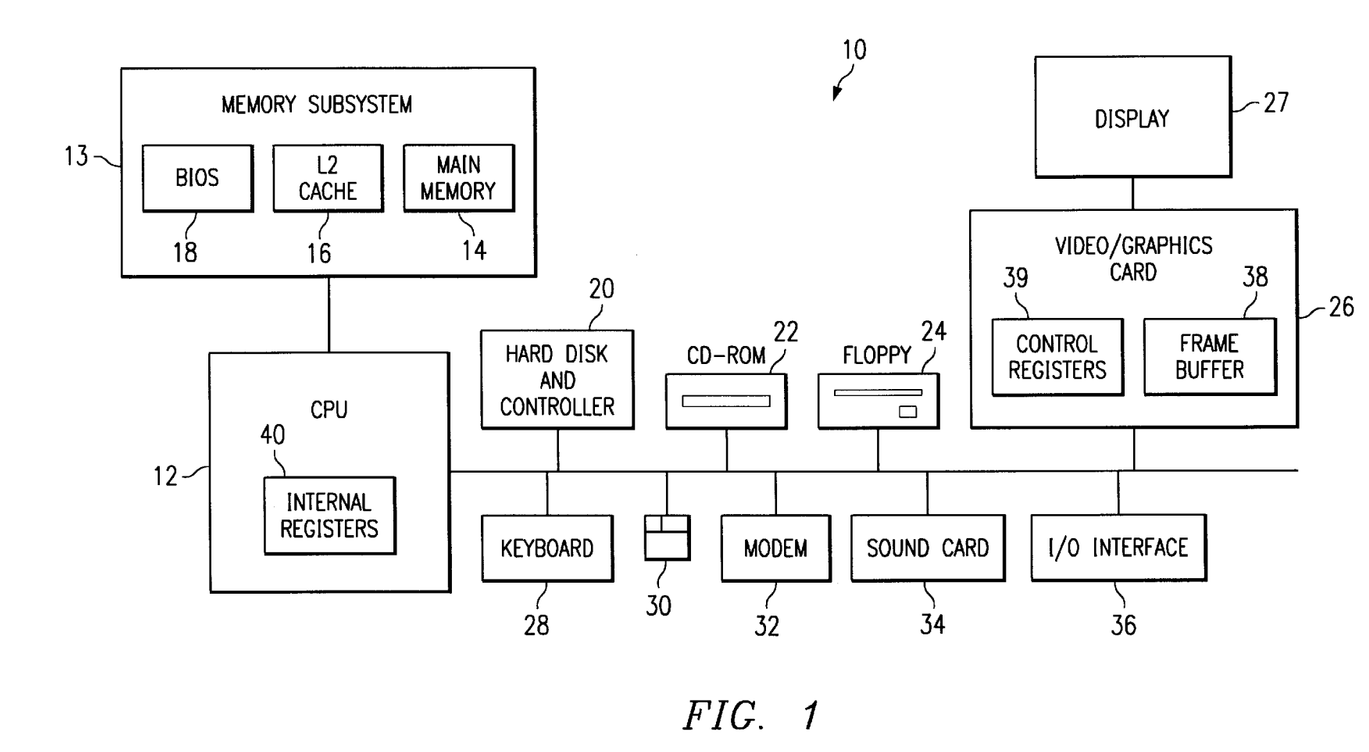
FIG. 1 is a block diagram of a computer system.

FIG. 1 illustrates a block diagram of an exemplary computer system 10 according to the present invention, as described in greater detail hereinbelow. A CPU (central processing unit) 12 is coupled to a semiconductor memory subsystem 13 (including main memory 14, a Level 2 (L2) cache memory 16, a BIOS (or similar program) memory 18 in the preferred embodiment), a hard drive storage memory and hard drive controller 20 (or other mass storage device), a CD-ROM (compact disc read only memory) 22, floppy disk drive 24, video/graphics card (hereinafter "video card") 26, a keyboard 28, a mouse 30, a modem 32, a sound card 34, and an I/O (input/output) interface 36.

It should be noted that the computer 10 shown above is a simplified block diagram, and the invention as described below could be used in many different computer configurations.

In operation, the main memory 14 stores both program code and data (hereinafter, both code and data will be referred to as "data" or "information"). The L2 cache is a cache memory, typically using SRAMs (static random access memories) which stores the most recently accessed data from the main memory for faster access. The main memory 14 typically uses DRAMs (dynamic random access memories). The BIOS memory 18 contains code which the computer uses to manage certain fundamental operations. In many conventional computers, the BIOS is stored in a Flash EEPROM (electrically erasable read only memory), which can be modified at a later date to include enhanced functions which were not available at the time of the initial BIOS coding. With a flash EEPROM, the BIOS memory 18 can be reprogrammed through the user's floppy disk. The Flash EEPROM retains its memory without power indefinitely.

Many of the devices coupled to the CPU 12 contain internal memories (including random access memories, registers, register files, and other devices for storing data), which are used for the operation of the device while the computer 10 is powered. The data stored in these devices is typically lost when the computer 10 is powered-down. For example, the video card includes a frame buffer 38 which stores the current state of the display 27 and control registers 39 used to configure the video cards electronics. The CPU 12 also has several internal registers which are used during the operation of the system. Additionally, some devices must be initialized at start up for proper operation through the use of a driver program which is typically one of the first programs loaded upon power-up of the computer 10. The driver initializes the device and provides communication protocols between the CPU 12 and the device.

Figure 2A:
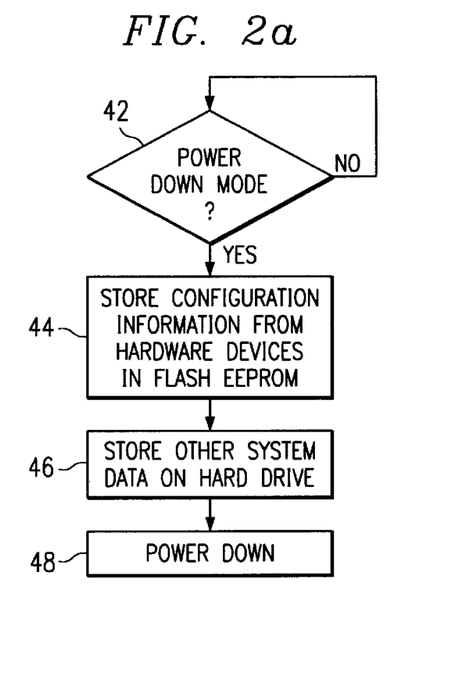
FIG. 2a is a flow chart describing a first embodiment of a power-down mode for saving state information.
Figure 2B:
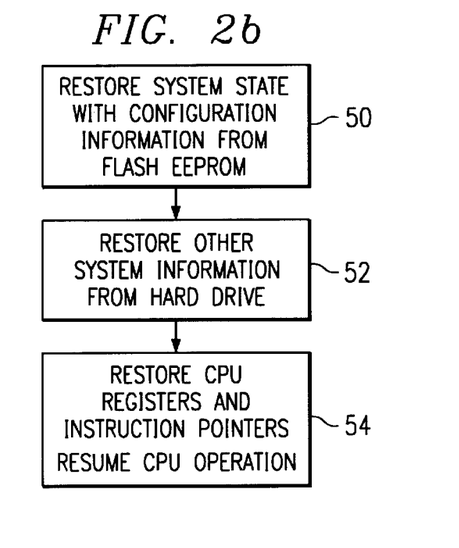
FIG. 2b is a flow chart describing a first embodiment of a power-up mode restoring state information.

A flow chart describing a first preferred embodiment is shown in FIGS. 2a–b. Decision block 42 waits until a power-down mode is initiated. This could occur, for example, by deliberate initiation of the power-down mode by the user or automatically upon detection of a predetermined period of inactivity. Once power-down mode begins (block 44), hardware configuration information, which would normally be supplied by the drivers upon start up, is stored in the flash EEPROM. This configuration information could include, for example, the information stored in configuration registers in the sound card, hard/floppy drive controllers, video card, and so on; such information being needed for proper operation of the device at start-up.

In block 46 the other system information such as the frame buffer memory and other data which is not needed at start-up is stored to the hard drive. Once all system information has been stored to either the flash EEPROM or the hard drive (or other mass storage device), the computer 10 is powered down in block 48.

Upon start-up, the program described in the flow chart of FIG. 2b is executed, typically being initiated by the BIOS boot program. In block 50, the information stored in the flash EEPROM is restored to the various memory locations. Thereafter, the computer is in a state where data can be reliably restored from the hard drive to the various devices in block 52. The CPU registers and instruction pointer are then restored to the CPU 12 and CPU operations are resumed in block 54. Because the computer 10 is restored to the same state as it was before initiated power-down, the user can continue as if the computer had never been turned off.

The embodiment illustrated in FIGS. 2a and 2b provides significant advantages over the prior art. Most importantly, restoration of information to the various devices is performed only after the configuration registers of all necessary devices, such as the hard drive controller, are restored to a proper operating state, as opposed to using default parameters to initialize various devices, as was done in the prior art.

The non-volatile memory needed in this embodiment can be implemented by either using the flash EEPROM, which stores the BIOS program, or by another flash EEPROM coupled to the CPU 12 for storage of the configuration information. The code for transferring information to and from the non-volatile memory can be a part of the BIOS, or similar program for controlling the hardware. For example, WINDOWS NT (by Microsoft Corp. of Redmond, Washington) uses a HAL (hardware architectural layer) to perform system level functions similar to the BIOS under MS-DOS.

Figure 3A:
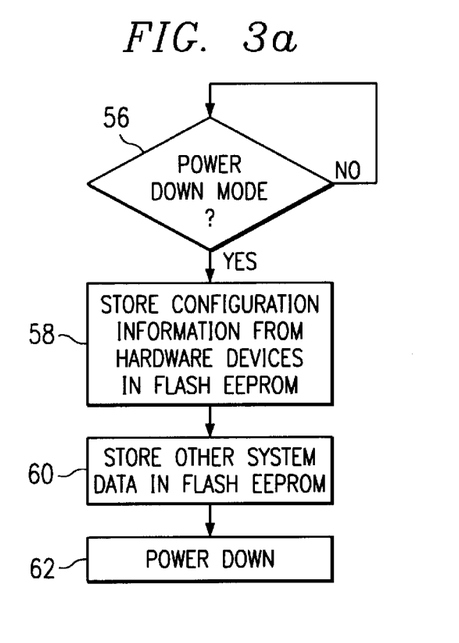
FIG. 3a is a flow chart describing a second embodiment of a power-down mode for saving state information.
Figure 3B:
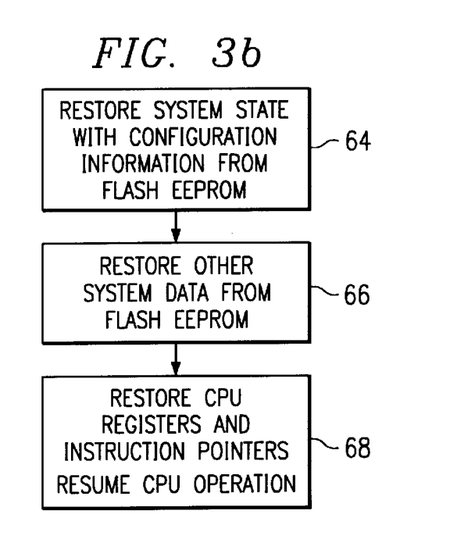
FIG. 3b is a flow chart describing a second embodiment of a power-up mode restoring state information.

A second embodiment is shown in FIGS. 3a and 3b. In this embodiment, a flash EEPROM (or other non-volatile semiconductor memory) is used to store both the configuration information and the other system information which was stored on the hard drive in the previous embodiment. Hence, after power-down is initiated in decision block 56, the configuration information for the hardware devices is stored in the flash EEPROM in block 58 along with the other system information in block 60. Thereafter, the power is removed from the system in block 62.

Upon power up of the computer 10, the program described in the flow chart of FIG. 3b is initiated. First, the system data, i.e., the configuration information for the hardware devices, is then restored from the flash EEPROM in block 64. Next, the other system information is restored from the flash EEPROM in block 66. Then, CPU instruction pointer is restored to its position prior to initiation of the power-down mode, and CPU operations are resumed in block 68.

As before, the code for transferring information to and from the non-volatile memory can be a part of the BIOS, or similar program for controlling the hardware, such as the HAL.

This embodiment uses a much larger flash EEPROM, since the data in the main memory and the frame buffer must be stored to the flash EEPROM. In order to avoid the necessity of an EEPROM which is the size of the largest addressable space of the processor (plus the largest frame buffer supported by the video card), a number of options are described below.

Figure 4:
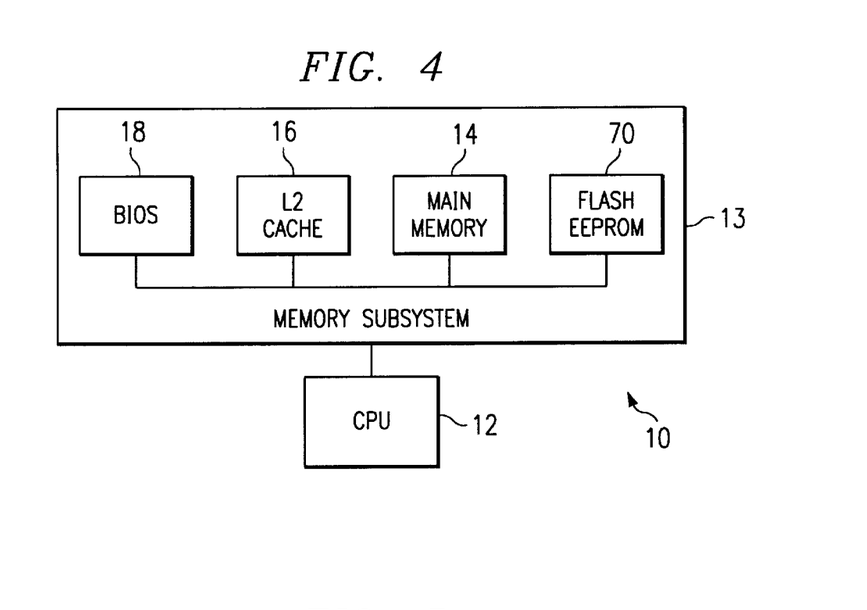
FIG. 4 is a block diagram of a portion of a computer system including a second embodiment of a memory subsystem.

In FIG. 4, a portion of the computer 10 is shown, including the CPU 12 and the semiconductor memory subsystem 13. The semiconductor memory subsystem, in addition to main memory 14, L2 Cache 16 and BIOS 18 includes a separate flash EEPROM memory 70 for storing the data from the various memories, as specified in blocks 58 and 60. In the preferred embodiment, the flash EEPROM 70 would comprise slots similar to that used for the main memory (for example, single in-line memory modules (SIMMs)) which would allow expandability as the main memory 14 or frame buffer 38 is expanded. Hence, the user could increase the flash EEPROM as the main memory 14 is expanded to optimize cost efficiency.

Figure 5:
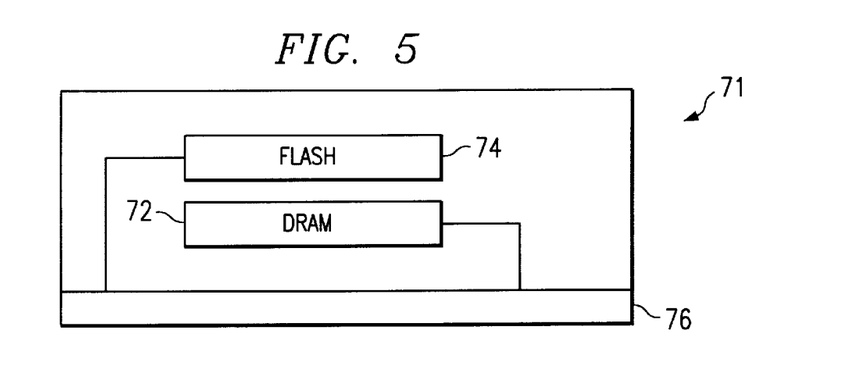
FIG. 5 is a block diagram of a first embodiment of a memory module containing volatile and non-volatile memory.

FIG. 5 illustrates a second embodiment for adding flash EEPROM as main memory (or other large memories such as the frame buffer) is added. FIG. 5 shows a front view of a SIMM module 71 containing both fast semiconductor memory chips 72 and flash EEPROM chips 74. For main memory SIMMs, DRAM could be used as the fast semiconductor memory 72. For a video memory, DRAM, VRAM (video random access memory) or WRAM (Window random access memory) could be used as the fast semiconductor memory 72. Similarly, in some configurations, SRAM could be used as the fast semiconductor memory.

In a SIMM module, the memory chips are coupled to the main circuit board through connector 76. For the fast semiconductor memory chips 72 and the flash EEPROM chips 74 to use the same address and data pins on connector 76, the flash EEPROM chips could be assigned an I/O address (as opposed to a memory address) so as not to conflict with the memory address space used by the semiconductor memory chips. For each address in the fast semiconductor memory 72, the flash EEPROM could have a corresponding address equal to the address of the fast semiconductor memory concatenated with one or more predetermined bits.

It should be noted that while the memory 71 is shown as a SIMM, the fast memory and the flash EEPROM could be combined on other modules as well.

The embodiment shown in FIG. 5 provides the advantage that every memory upgrade will automatically update the amount of flash EEPROM needed to store the data as described hereinabove.

It is assumed, in FIGS. 4 and 5, that data is not compressed prior to storage in flash EEPROM; however, if compression is used, it may be possible to use an amount of flash EEPROM which has less capacity than the fast semiconductor memory. However, to use less memory, estimates of the degree of compression must be made, which may be inaccurate for certain information which does not compress, or for information which does not compress to the degree estimated.

Figure 6:
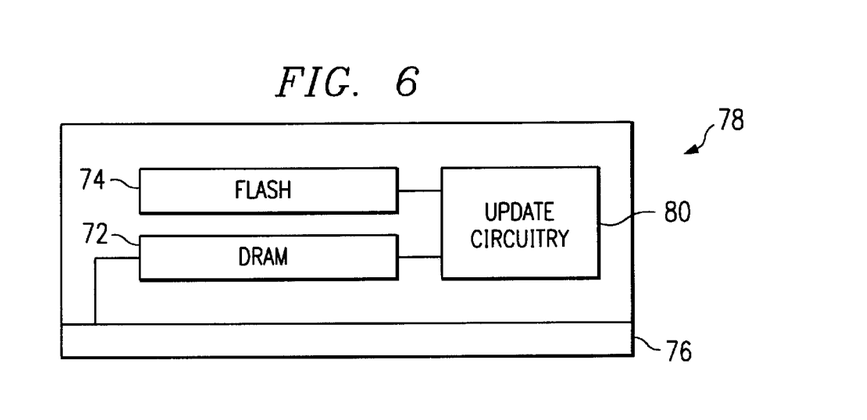
FIG. 6 is a block diagram of a second embodiment of a memory module containing volatile and non-volatile memory.

In FIG. 5, the transfer of data to the flash EEPROM is made when power down mode is entered. FIG. 6 illustrates a variation on the SIMM module of FIG. 5 wherein data is transferred from the fast semiconductor memory chips 72 to the flash EEPROM chips 74 during operation of the computer, under control of update circuitry 78, which is coupled between fast semiconductor memory 72 and flash EEPROM 74.

FIG. 6 illustrates an embodiment of a combination fast memory/flash EEPROM module 78 including update circuitry 80 for transferring information directly between the fast memory 72 and the flash EEPROM 74 without CPU intervention, similar to a local DMA (direct memory access) operation. In FIG. 6, update circuitry 80 is coupled to fast memory 72 (shown as DRAM) and flash EEPROM 74.

In this embodiment, the data in fast memory may be transferred to the flash EEPROM using the update circuitry 80 on the module itself, without the need for the CPU 12 to read data from the fast memory 72 and write the same data to the flash EEPROM 74. Consequently, the CPU 12 is free to perform other functions while the update occurs.

Figure 7:
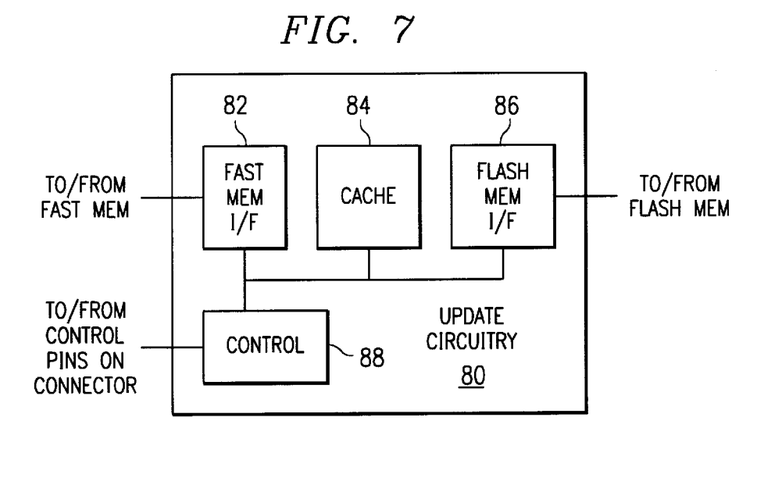
FIG. 7 is a block diagram of a preferred embodiment of the update circuitry used in FIG. 6.

A preferred embodiment of the update circuitry 80 is shown in FIG. 7. A fast memory interface circuit 82 interfaces with the fast memory 72. A cache memory 84 is coupled between the fast memory interface 82 and the flash memory interface 86, which interfaces with the flash EEPROM 74. A control circuit 88 is coupled to the fast memory interface 82, the cache 84 and the flash interface 86. The control circuit 88 also is connected to control signal locations on the SIMM (or other) connector.

In operation, the fast memory interface 82 receives data from and transfers data to the fast memory 72, responsive to control circuit 88. Similarly, the flash memory interface 86 receives data from and transfers data to the flash EEPROM 74, responsive to control circuit 88. The cache memory 84 temporarily stores data from the fast memory 72. The cache memory 84 may be implemented as a FIFO (first-in, first-out) memory.

Figure 8:
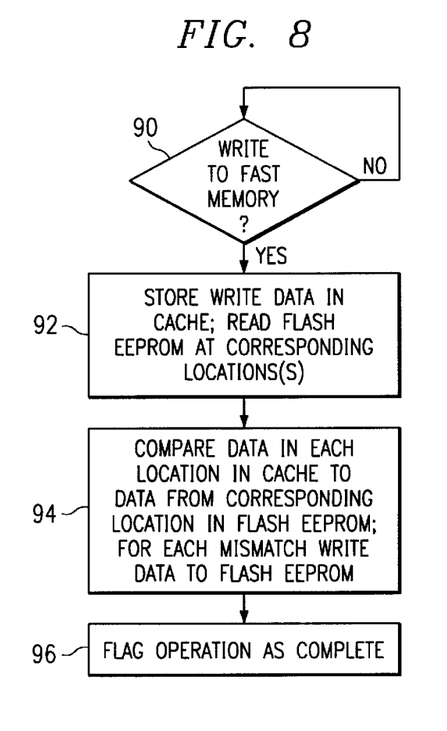
FIG. 8 is a flow chart describing a first method for copying data from the volatile to the non-volatile memory.

Operation of control circuitry 88 will now be described with reference to FIGS. 7 and 8. The control circuitry monitors writes to the fast memory 72 through its connection to the control signals on the SIMM module. When the computer writes to the fast memory 72 on the module, the control circuitry 88 detects the write operation in decision block 90. In block 92, the data written to the fast memory 72 is stored in cache 84 and the corresponding memory locations in the flash EEPROM 74 are accessed. In block 94, the data in each location in the cache 84 is compared to the data from the corresponding location in the flash EEPROM 74; if the values are not equal, the data from the cache 84 is written to the corresponding location in flash EEPROM 74. In block 96, a flag is set indicating that the operation is complete.

By comparing and writing only data which has changed to the flash EEPROM 74, the number of writes to the flash EEPROM 74 is reduced, which will prolong the life of the flash EEPROM 74.

Figure 9:
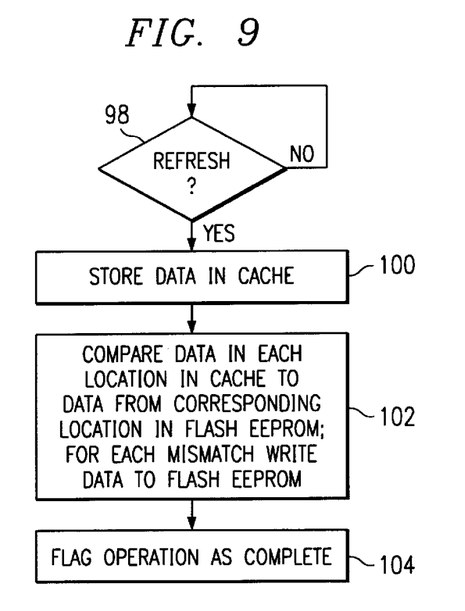
FIG. 9 is a flow chart describing a second method for copying data from the volatile to the non-volatile memory.

FIG. 9 is a flow chart illustrating an alternative embodiment for transferring data to the flash EEPROM during operation of the computer under control of control circuitry 88. In decision block 98, it is determined whether a refresh operation has been initiated, and in block 100, data from the fast memory 72 is read into the cache 84 during refresh of the DRAM comprising the fast memory (this presumes that static memory, or SRAMs, are not being used as the fast memory 72). In block 102, the data in each location in the cache 84 is compared to the data from the corresponding location in the flash EEPROM 74; if the values are not equal, the data from the cache 84 is written to the corresponding location in flash EEPROM 74. In block 104, a flag is set indicating that the operation is complete.

This embodiment provides the advantage of performing the transfer of data during a refresh when the data from the fast memory can be made available during a period of inaccessibility of the fast memory. Therefore, the reading of the DRAM will not cause any further delays in the memory system other than those which would occur during normal operation.

Figure 10:
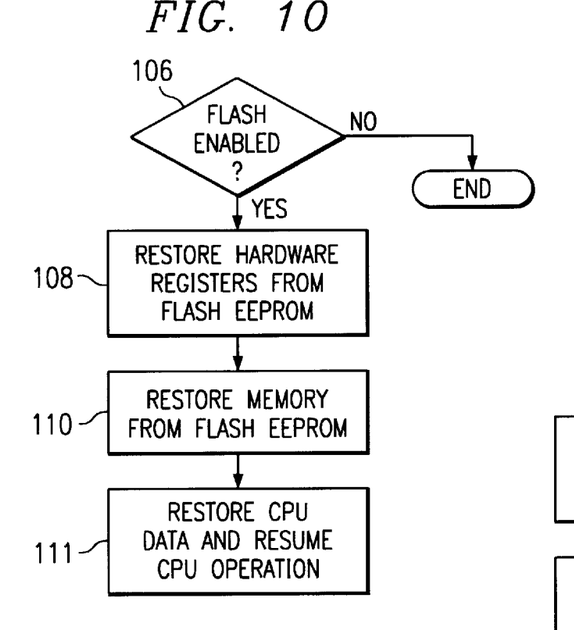
FIG. 10 is a flow chart describing restoration of the state of the computer system on power-up.

FIG. 10 illustrates a flow chart of operations which are performed at the beginning of the boot program as part of the BIOS, HAL or similar program, to restore data from the flash EEPROM to the various memories in the computer, using the memory modules shown in FIGS. 5 and 6. In decision block 106, it is determined whether or not the computer is flash EEPROM enabled, for purposes of restoring memory at start-up. If so, then the hardware registers in the various devices are restored in block 108. This can be done, for example, by reference to a state table which indicates which locations in the flash EEPROM (which may be spread out in combinations of BIOS flash EEPROM, separate flash EEPROM on the motherboard and as part of memory/flash EEPROM modules) are to be copied to the various locations in each device. Consequently, each device is set up to its last state prior to power-down. In block 110, the fast memory modules are restored to their prior state. This step may occur simultaneous to the operations in step 108.

In block 111, the CPU registers are restored to their prior state and the instruction pointer of the CPU 12 is restored to its last state to begin operations where the user left off. This can be accomplished by an SMI (system management interrupt) operation; SMI operations are supported by most present day computers with power management features.

Figure 11:
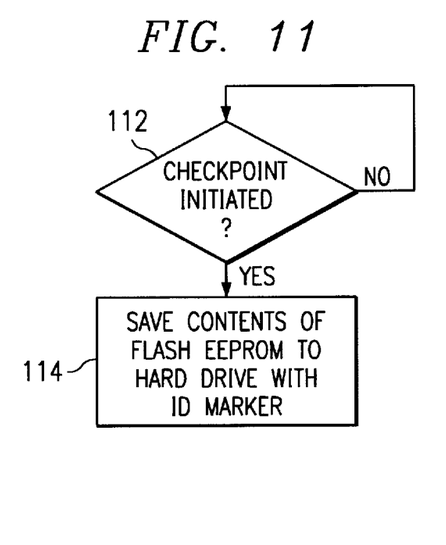
FIG. 11 is a flow chart describing checkpointing states for later restoration to a previously stored state.

FIG. 11 is a flow chart of another feature which can be used in conjunction with flash EEPROM storage to allow rollback to a previous state. During operation of the computer 10, the user may select checkpoints by a predetermined command (or the computer may initiate checkpoints automatically at programmable time intervals or other criteria). In block 112, it is determined whether a checkpoint has been initiated. If so, of the computer is stored onto the hard drive (block 114). The data stored to the hard drive would include the information described above which is saved to the flash EEPROM. The hard drive would also save a marker (such as time or a designation provided by the user) which would identify the state. For example, the user could designate a state as "Prior to Sorting Database." Operation then continues as described above, with writes to the fast memory being transferred to flash EEPROM. The program which stores the data to hard drive, as described in FIG. 11, could be part of the operating system, BIOS or HAL or similar program.

Figure 12:
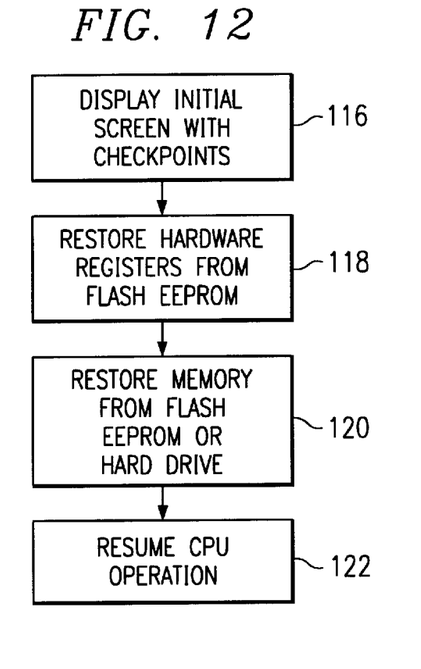
FIG. 12 is a flow chart describing restoration to a checkpointed state at start-up.

As shown in the flow chart of FIG. 12, on start-up of the computer, the user would be presented an initial screen, which could be stored in the flash EEPROM, with a list of available checkpoints listed (block 116). After a checkpoint (or the last state prior to power-down) is selected, the hardware registers of the various devices are restored from the flash EEPROM, since data should not be read from the hard drive prior to initialization of the hardware devices (block 118). In block 120, the memory (for example the main memory and the frame buffer) is restored from the hard drive, if a checkpoint is selected, or the flash EEPROM, if the last state of the computer is selected. In block 122, CPU operation is resumed, as described above.

It should be noted that the state of the computer could be rolled back without power-down as well; i.e., rollback could occur during operation of the computer without power-down.

The present invention provides significant advantages over the prior art. First, all devices, such as the sound card, hard drive, I/O, and so on, are not used until they have been properly initialized. Second, the state of the machine can be quickly restored upon power-up. Third, the user can return to the exact state prior to power down, without reloading application programs and files. Fourth, since returning to a prior state is simplified, the computer may be powered down more often, resulting in vastly improved power use. Fifth, the amount of non-volatile semiconductor memory can be added as needed.

Although the Detailed Description of the invention has been directed to certain exemplary embodiments, various modifications of these embodiments, as well as alternative embodiments, will be suggested and apparent to those skilled in the art. For example, other non-volatile semiconductor memory could be used throughout the various embodiments in place of the flash EEPROM, such as other types of EPROM memory. The invention encompasses any modifications or alternative embodiments that fall within the scope of the claims.

What is claimed is:

1. A computer system comprising:
a processor;
a hard drive and one or more other devices coupled to said processor, said devices having internal memories for storing configuration data supplied to said devices by device drivers upon initialization of said computer system; and
a flash memory coupled to said processor, configuration data from said internal memories being stored in said flash memory and system data, other than said configuration data, being stored in said hard drive when said computer system is in a desired state.

2. The computer system of claim 1 wherein said flash memory also stores a boot program for loading and executing an operating system program upon power-up of the computer system.

3. The computer system of claim 1 wherein said flash memory also stores a system basic input output system (BIOS) program.

4. The computer system of claim 1 wherein said flash memory comprises a flash electrically erasable programmable read only memory (EEPROM).

5. The computer system of claim 1, wherein said desired state is a power-down mode.

6. The computer system of claim 1, wherein said configuration data includes at least one from the group of: information stored in configuration registers in a sound card; information stored in configuration registers in a hard drive controller; information stored in configuration registers in a floppy drive controller; and information stored in configuration registers in a video card.

7. The computer system of claim 1, wherein said configuration data is the data required for proper operation of said respective devices.

8. The computer system of claim 1, wherein said system data, other than said configuration data, is data which, in combination with said configuration data, is required to restore said computer system to the same state it was in prior to said desired state.

9. The computer system of claim 8, wherein said system data, other than said configuration data, includes, includes data from a frame buffer memory.

10. The computer system of claim 1 further comprising a random access memory coupled to said flash memory.

11. The computer system of claim 10 wherein said random access memory and said flash memory are disposed upon a selectively insertable and removable module.

12. The computer system of claim 11 further including update circuitry on said module for transferring information from said random access memory to said flash memory without intervention by said processor.

13. The computer system of claim 12 wherein said update circuitry transfers information from said random access memory to said flash memory during a memory refresh cycle for said random access memory.

14. The computer system of claim 12 wherein said update circuitry transfers information from said random access memory to said flash memory at programmable time intervals.

15. The computer system of claim 12 wherein said update circuitry transfers information from said random access memory to said flash memory in response to a user command.

16. A method of operating a computer system, comprising the steps of:
   storing configuration data from internal memories of one or more system devices into a flash memory when the computer system is in a desired state;
   storing system data, other than said configuration data, into a hard drive when the computer system is in said desired state;
   removing power from the computer system; and
   upon restoring power to the computer system, restoring the configuration data from the flash memory to the internal memories of said one or more system devices and restoring the system data, other than said configuration data, from the hard drive to the system devices.

17. The method of claim 16 wherein said step of storing configuration data further comprises storing configuration data from internal memories of one or more system devices to a flash electrically erasable programmable read only memory (EEPROM) when the computer system is in a desired state.

18. The method of claim 16 wherein said step of storing configuration data further comprises storing configuration data from internal memories of one or more system devices to a flash electrically erasable programmable read only memory (EEPROM) which also stores a system BIOS program.

19. The method of claim 16 further comprising the inclusion within said computer system of a semiconductor random access memory for storing data, and transferring information from said semiconductor random access memory to said non volatile semiconductor memory.

20. The method of claim 16, wherein said desired state is a power-down mode.

21. The method of claim 16, wherein said configuration data includes at least one from the group of: information stored in configuration registers in a sound card; information stored in configuration registers in a hard drive controller; information stored in configuration registers in a floppy drive controller; and information stored in configuration registers in a video card.

22. The method of claim 16, wherein said configuration data is the data required for proper operation of said respective devices.

23. The method of claim 16, wherein said system data, other than said configuration data, is restored only after configuration registers of said devices are restored to a proper operating state.

24. The method of claim 16, wherein said step of restoring said configuration data is prior to said step of restoring said system data, other than said configuration data.

25. The method of claim 16 wherein said step of restoring the configuration data includes restoring configuration data to a hard drive controller.

26. The method of claim 25 further comprising the step of restoring data to a main memory from a hard drive after restoring configuration data to the hard drive controller.

27. The method of claim 16, wherein said system data, other than said configuration data, is the data that, in combination with said configuration data, is required to restore said computer system to the same state it was in prior to said desired state.

28. The method of claim 27, wherein said system data, other than said configuration data, includes data from a frame buffer memory.

29. A computer system comprising:
   a processor;
   a hard drive and one or more other devices coupled to said processor, said devices having internal memories for storing configuration data supplied to said devices by device drivers upon initialization of said computer system; and
   a memory subsystem coupled to said processor, said memory subsystem comprising:
   a bios memory;
   a cache memory;
   a main memory; and
   a flash electrically erasable programmable read only memory (EEPROM) coupled to said bios, cache and main memories, configuration data from said internal memories being stored in said flash EEPROM and system data, other than said configuration data, being stored in said hard drive when said computer system is in a desired state.

30. A computer system comprising:
   a processor;
   a hard drive and one or more other devices coupled to said processor, said devices having internal memories for storing configuration data supplied to said devices by device drivers upon initialization of said computer system; and
   a semiconductor non-volatile memory coupled to said processor, configuration data from said internal memories being stored in said semiconductor non-volatile memory and system data, other than said configuration data, being stored in said hard drive when said computer system is in a desired state.

31. A computer system comprising:
   a processor;
   a hard drive and one or more other devices coupled to said processor, said devices having internal memories for storing configuration data supplied to said devices by device drivers upon initialization of said computer system; and
   a memory subsystem coupled to said processor, said memory subsystem comprising:
   a bios memory;
   a cache memory;
   a main memory; and
   a semiconductor non-volatile memory coupled to said bios, cache and main memories, configuration data from said internal memories being stored in said semiconductor non-volatile memory, and system data, other than said configuration data, being stored in said hard drive when said computer system is in a desired state.

32. A method of operating a computer system, comprising the steps of:

storing configuration data from internal memories of one or more system devices into a semiconductor non-volatile memory when the computer system is in a desired state;

storing system data, other than said configuration data, into a hard drive when the computer system is in said desired state;

removing power from the computer system; and upon restoring power to the computer system, restoring the configuration data from the semiconductor non-volatile memory to the internal memories of said one or more system devices and restoring the system data, other than said configuration data, from the hard drive to the system devices.

* * * * *